United States Patent
Dayan

(10) Patent No.: US 12,261,849 B2
(45) Date of Patent: *Mar. 25, 2025

(54) AUTOMATIC LEAST-PRIVILEGE ACCESS AND CONTROL FOR TARGET RESOURCES

(71) Applicant: CyberArk Software Ltd., Petach-Tikva (IL)

(72) Inventor: Tomer Dayan, Petach-Tikva (IL)

(73) Assignee: CyberArk Software, Ltd., Petach-Tikva (IL)

( * ) Notice: Subject to any disclaimer, the term of this patent is extended or adjusted under 35 U.S.C. 154(b) by 870 days.

This patent is subject to a terminal disclaimer.

(21) Appl. No.: 17/468,632

(22) Filed: Sep. 7, 2021

(65) Prior Publication Data

US 2021/0409421 A1    Dec. 30, 2021

Related U.S. Application Data

(63) Continuation-in-part of application No. 16/674,985, filed on Nov. 5, 2019, now Pat. No. 11,128,637.

(51) Int. Cl.
*H04L 29/06* (2006.01)
*H04L 9/40* (2022.01)
*G06N 20/00* (2019.01)

(52) U.S. Cl.
CPC ........... *H04L 63/105* (2013.01); *H04L 63/08* (2013.01); *H04L 63/205* (2013.01); *G06N 20/00* (2019.01)

(58) Field of Classification Search
CPC ...... H04L 63/105; H04L 63/205; G06N 20/00
See application file for complete search history.

(56) References Cited

U.S. PATENT DOCUMENTS

| | | | |
|---|---|---|---|
| 2012/0210427 A1* | 8/2012 | Bronner | H04L 63/30 726/23 |
| 2013/0227634 A1 | 8/2013 | Pal et al. | |
| 2016/0205238 A1 | 7/2016 | Abramson et al. | |
| 2016/0323280 A1* | 11/2016 | Sade | H04L 63/0807 |

OTHER PUBLICATIONS

Mark Russinovich, "PsExec," ITPro Today (Jun. 28, 2004) https://www.itprotoday.com/compute-engines/psexec, 7 pages.

\* cited by examiner

*Primary Examiner* — Evans Desrosiers
(74) *Attorney, Agent, or Firm* — FINNEGAN, HENDERSON, FARABOW, GARRETT & DUNNER L.L.P.

(57) ABSTRACT

The disclosed embodiments include systems and methods for performing operations using least-privilege access to and control of target network resources. Operations may include identifying a prompt associated with a least-privilege requesting identity to initiate an action on a target network resource; executing, in response to the prompt, a first set of executable code; initiating, based on the first set of executable code, execution of a second set of executable code on the target network resource, wherein the second set of executable code executes using a least-privilege credential or using least-privilege permissions, the least-privilege credential and the least-privilege permissions being determined according to a least-privilege security policy associated with a type of activity expected to be performed on the target network resource; and instructing the second set of executable code to perform the action remotely on the target network resource through a remote session.

20 Claims, 7 Drawing Sheets

AUTOMATIC LEAST-PRIVILEGE ACCESS AND CONTROL FOR TARGET RESOURCES

RELATED APPLICATIONS

This application is a continuation-in-part of U.S. patent application Ser. No. 16/674,985, filed Nov. 5, 2019.

BACKGROUND

Privileged session managers are systems that enable users to securely access remote resources. However, access to remote resources may render the resources vulnerable (e.g., to improper access) and some resources may require administrator privileges to perform certain functions.

By granting administrative privileges on remote systems, unnecessarily strong credentials may be given to people and/or applications accessing the remote resource. These credentials may be misused, and may be vulnerable to proliferation to other users or machines. When privileged credentials fall into the hands of an attacker, they allow the attacker to take control of an organization's IT infrastructure, disable security controls, steal confidential information, commit financial fraud, and otherwise disrupt operations. Stolen, abused, or misused privileged credentials are involved in a large proportion of network security breaches.

Further, for remote access and code execution, the remote resource may be required to have pre-installed or pre-configured software to allow the session manager to access and control the target remote resource. This results in inefficiencies and also means some resources cannot be accessed immediately if so required.

It would be advantageous, however, for technological solutions to allow a session manager to securely provision access to a remote resource without pre-configuration. Further, it would be advantageous to enable access and enable certain functions, without providing the remote resource with more privileges than necessary to complete its functions. Additionally, it would be advantageous to provide a least-privilege identity the ability to perform an action on a target without an agent pre-installed by using predefined sets of executable codes that are not retrieved from a specific location. In view of these advantages, and the technical deficiencies of existing approaches to remote access and code execution, there is thus a need for technological solutions for using least-privilege methodologies to access and control remote resources.

SUMMARY

The disclosed embodiments describe systems and methods for performing operations using least-privilege access to and control of target network resources.

In some embodiments, a non-transitory computer readable medium may include instructions that, when executed by at least one processor, cause the at least one processor to perform operations using least-privilege access to and control of target network resources. The operations may include identifying a prompt associated with a least-privilege requesting identity to initiate an action on a target network resource. The operations may include executing, in response to the prompt, a first set of executable code. The operations may include initiating, based on the first set of executable code, execution of a second set of executable code on the target network resource, wherein the second set of executable code executes using a least-privilege credential or using least-privilege permissions, the least-privilege credential and the least-privilege permissions being determined according to a least-privilege security policy associated with a type of activity expected to be performed on the target network resource. The operations may include instructing the second set of executable code to perform the action remotely on the target network resource through a remote session using the least-privilege credential or using the least-privilege permissions.

According to a disclosed embodiment, the least-privilege credential or least-privilege permissions are associated with the least-privilege requesting identity.

According to a disclosed embodiment, the second set of executable code is originated from at least one of: the requesting identity, a shared resource, a secured resource, a cloud-based resource, or an application itself.

According to a disclosed embodiment, the second set of executable code is one of a script file, a text script, a command, an executable file, an executable moved to a RAM, or a pointer.

According to a disclosed embodiment, the prompt includes at least one of: a request from a client network resource, or a scheduled event involving access to the target network resource.

According to another disclosed embodiment, after the initiating execution, the first set of executable code ceases operation with respect to the second set of executable code.

According to another disclosed embodiment, the prompt further includes an indication of a type of requested activity.

According to another disclosed embodiment, the operations may further include initiating, by the first agent and based on the prompt, execution of the second agent on a group of target network resources, and instructing the second agent to perform actions remotely on the group of target network resources.

According to another disclosed embodiment, the linking is performed using machine learning operations.

According to another disclosed embodiment, the linking of the particular action to the particular target or particular identity is based on at least one of: an attribute related to the identity, an attribute related to the particular target, an attribute related to the particular action or an environment variable.

According to a further disclosed embodiment, a computer-implemented method may use least-privilege access to and control of target network resources. The method may comprise identifying a prompt associated with a least-privilege requesting identity to initiate an action on a target network resource. The method may comprise executing, in response to the prompt, a first set of executable code. The method may comprise initiating, based on the first set of executable code, execution of a second set of executable code on the target network resource, wherein the second set of executable code executes using a least-privilege credential or using least-privilege permissions, the least-privilege credential and the least-privilege permissions being determined according to a least-privilege security policy associated with a type of activity expected to be performed on the target network resource. The method may comprise instructing the second set of executable code to perform the action remotely on the target network resource through a remote session using the least-privilege credential or using the least-privilege permissions.

According to a disclosed embodiment, the least-privilege credential or least-privilege permissions are associated with the least-privilege requesting identity.

According to another disclosed embodiment, the second set of executable code is originated from at least one of: the requesting identity, a shared resource, a secured resource, a cloud-based resource, or an application itself.

According to a further disclosed embodiment, the second set of executable code is one of a script file, a text script, a command, an executable file, an executable moved to a RAM, or a pointer.

According to another disclosed embodiment, conditional on validating network address information, accessing the least-privilege credential for use in performing the action remotely on the target network resource.

According to a further disclosed embodiment, the least-privilege credential is configured based on an identity profile corresponding to network address information.

According to another disclosed embodiment, the prompt further includes an indication of a type of requested activity.

According to another disclosed embodiment, the computer-implemented method comprises linking a particular action to a particular target or a particular identity.

According to another disclosed embodiment, the linking is performed using machine learning operations.

According to another disclosed embodiment, the linking of the particular action to the particular target or particular identity is based on at least one of: an attribute related to the identity, an attribute related to the particular target, an attribute related to the particular action or an environment variable.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor (s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
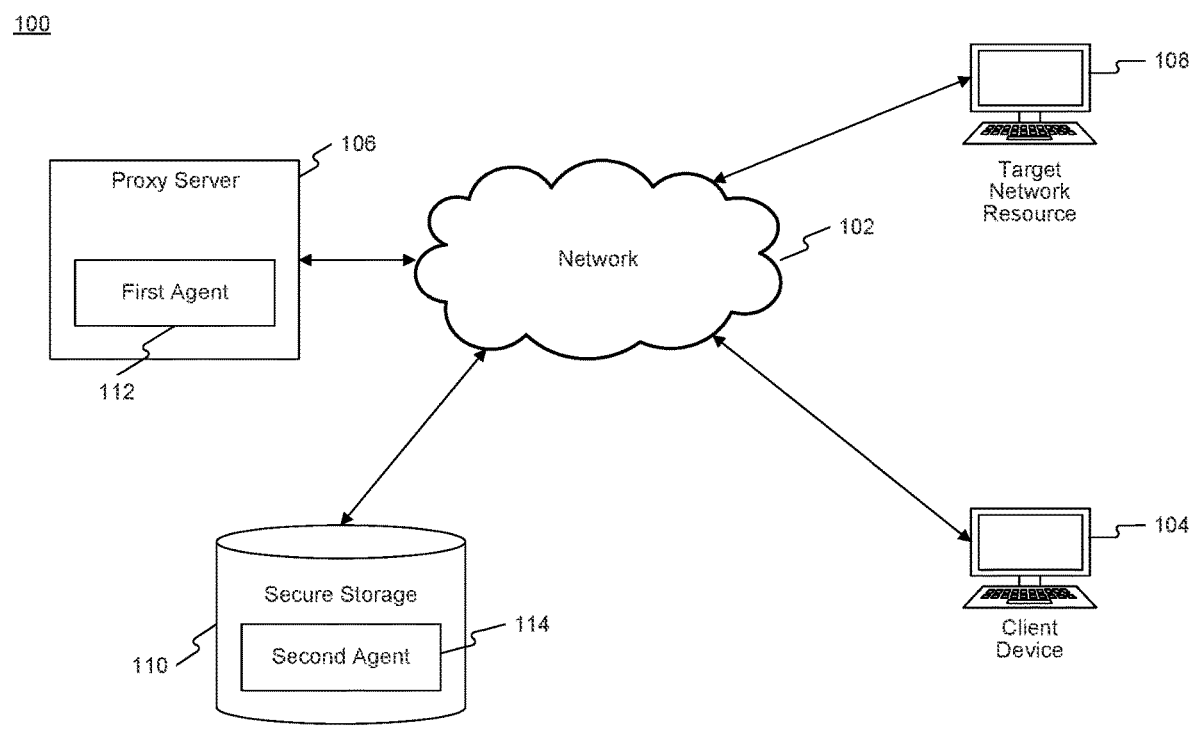
FIG. 1 is a block diagram of an example system for using least-privilege access to and control of target network resources, in accordance with disclosed embodiments.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

Session managers are applications that may be used to facilitate access to remote network resources by one or more computing or client devices of the network. For example, a session manager may connect to a target resource to initiate a remote session via remote desktop protocol (RDP). During this session, the session manager may impersonate an account having administrative privileges on the target resource and may create an invoker service on the target resource. The session manager may send the invoker service a message including and/or identifying an executable to dispatch on the target resource. Finally, the invoker service may dispatch an agent to cause the target resource to run the executable with administrator privileges.

However, certain audits that may be desired, for example, to monitor remote sessions, may require the target resource, or the agent running on the target resource, to have administrator privileges. Granting an agent running on the target resource administrator privileges may give the agent unnecessarily broad privileges beyond those normally necessary to execute the agent's required functions. An attacker may use those privileges in an unauthorized way to control functions of the target resource or possibly other network resources (e.g., machines, applications, data, etc.).

In the disclosed embodiments, systems for implementing least-privilege access to and control of target network resources are described. In some embodiments, systems may implement least-privilege code execution on target network resources. Disclosed embodiments enable any identity, application, service, user, etc. to access and execute functions on a remote resource securely, with least-privileges (i.e., a minimal scope of needed privileges, and/or a minimal duration of privileges). Further, disclosed systems are compatible with any protocol enabling remote sessions, e.g., RDP, an HTML5 solution, or any protocol supporting tunneling to a remote machine such as SSH port forwarding. Over RDP, the system may use clients including, for example, RD-desktop, ts-client, vrdp by Oracle™, Free RDP, or any other RDP client. Alternatively, process execution may be facilitated by an application enabling a remote desktop, e.g., Remote Desktop by Google Chrome™, TeamViewer™, LogmeIn™, or Citrix™, as well as other remote access services. For example, if Logmein™ is already installed on the target resource, it may be used to connect to the target resource transparently and perform automatic remote process execution.

Further, in other embodiments, the system may enable an identity to access a group of target resources, e.g., to execute code and/or automated processes on the group of target resources. For example, the system may invoke automated execution on a plurality of defined target applications or machines. This may be useful in situations where a common task needs to be performed for a group of resources (e.g., a software update, patch installation, data provisioning, etc.).

Disclosed embodiments enable automated remote process execution on one or a group of target resources. For example, embodiments enable a system to: execute automatic upgrades to existing applications on a target resource;

retrieve data from the resource; access files, data, or applications residing on the resource; retrieve metrics stored by or associated with the resource; perform one-time maintenance on the resource; perform and/or schedule a job to execute periodically on the resource; retrieve keystrokes and/or window titles associated with a remote session, without requiring administrator privileges on the resource; and perform various other operations.

In some embodiments, the system may identify a prompt from a computer device associated with an identity requesting access to a target resource. As disclosed below, a computer device may be any of numerous types of devices with data processing and network communications capabilities. Examples include servers, desktop computers, cloud-computing virtual machines or containers, laptops, smartphones, tablets, personal digital assistants, enterprise digital assistants, smart cards, smart watches, smart bands, smart headphones, computer-embedded clothing, car-computers and other in-vehicle computer equipment, Internet-of-Things (IoT) devices, and any other device with data processing and network connectivity capabilities.

As disclosed herein, an identity may be a user account, machine account, application account, or any other type of account that can be established and associated with a particular user, machine, or application in a computer network. Examples include operating system user accounts (e.g., in Microsoft Windows™, Apple OS™ versions, Linux accounts, etc.), and accounts created for the purpose of running machines or applications (e.g., in a machine-to-machine or application-to-application communications environment). Identities may have varying levels of access rights associated with them, ranging from so-called "super-user" accounts with broad access rights (potentially root access privileges), administrator accounts with varying degrees of access rights, executive or VIP accounts with varying degrees of access rights, regular user accounts with generally narrower access rights, and guest or unknown accounts with even less access rights. An identity may be used to access resources distributed in a computer network and, additionally or alternatively, may be used to access one or more resources of a local machine or computing device, such as a locally installed application or remote desktop, for example.

As described herein, in some embodiments, identities, computer devices, or users may be authenticated before access to and/or control of the target resource is granted or before an identity can cause the target resource to execute code. Authentication may broadly take several forms, such as verification of passwords, SSH keys, asymmetric (e.g., public/private) keys, symmetric keys, Kerberos tickets, Docker signed tags, and other types of cryptographic data or privileged security or access tokens. Further, the authentication may be based on white/black lists for identities or device addresses, or biometric or behavioral information, such as fingerprints, retinal scans, x-rays, biosensors, voice recognition, body movements, walking pace or rhythm, sitting characteristics or patterns, key stroke analysis, and more. In accordance with the disclosed embodiments, the authentication may be single-factor or multi-factor (i.e., a combination of any of the foregoing forms of authentication). Further, as discussed below, the authentication may be performed on the computer device, on a remote authentication server, or through a combination of functionality of both.

Reference will now be made in detail to the disclosed embodiments, examples of which are illustrated in the accompanying drawings.

FIG. 1 is a block diagram of an example system 100 for using least-privilege methodologies to access, control, and/or execute code on a target resource consistent with the disclosed embodiments. As shown, system 100 includes a network 102 communicatively connecting a client device 104, a proxy server 106, a target network resource 108, and secure storage 110. In addition to the examples of a computer, laptop, mobile device, and IoT device, client device 104 shown in system 100 may be one of a variety of other types of computer devices, such as tablets, personal digital assistants, enterprise digital assistants, smart cards, smart watches, smart bands, smart headphones, computer-embedded clothing, car-computers and other in-vehicle computer equipment, and any other device with data processing and network connectivity capabilities. In various embodiments, client device 104 may be associated with one or more identities. Similarly, target network resource 108 may be associated with one or several identities.

System 100 may also include a proxy server 106, which is configured for communications with client device 104 and target network resource 108. Proxy server 106 may be one or more of various types of servers, whether a single server machine, a group of common server machines, or a server farm. In some embodiments, proxy server 106 may be an application or agent, rather than a dedicated, physical server. In other embodiments, proxy server 106 may be an application or agent on client device 104. As discussed further below, proxy server 106 may have multiple functions (e.g., executing a first agent, initiating a second agent executed on the target network resource 108, and in some embodiments instructing the second agent to perform an operation on the target network resource 108), and these functions may be performed by a single server machine (or application) or multiple server machines (or applications). In alternate embodiments the second agent itself (e.g., rather than the proxy server 106) may contain its own instructions to perform operations on target network resource 108.

In some embodiments, proxy server 106 may be configured to authenticate an identity associated with client device 104 before initiating and executing the second agent on target network resource 108. As discussed above, the authentication may take various forms, such as the verification of passwords or cryptographic data, biometric data, or behavioral data, etc. In addition to performing authentication, or in the alternative, proxy server 106 may retrieve, from a credential vault (e.g., CyberArk™ vault) or credential storage, one or more privileges associated with the identity.

In some embodiments, proxy server 106 may be or may be based on, for example, a CyberArk® Privileged Session Manager®, On-Demand Privileges Manager™ or other similar system. Proxy server 106 may further run a first agent 112 configured to open a remote desktop (e.g., via remote desktop protocol (RDP)) associated with target network resource 108, as discussed further below. In some embodiments, the first agent 112 may be stored in a secure storage 110. The secure storage 110 may have, for example, an authentication requirement and/or an encryption policy for encrypting its contents.

The proxy server 106 may interact with the client device 104 and target network resource 108 in different flows or sequences. For example, as discussed below, proxy server 106 may be configured to identify a prompt from a requesting identity (e.g., from client device 104) for remote access to target network resource 108. In response to the prompt, proxy server 106 may execute first agent 112. In some embodiments, proxy server 106 may, via first agent 112, open a remote session with target network resource 108. A remote session connection may be facilitated by proxy server 106 and may be established between client device 104 and target network resource 108 through several techniques, such as Microsoft's Remote Desktop Connection (RDC)™ or Remote Desktop Services (RDS)™, Microsoft's Remote Desktop Protocol (RDP)™, VNC™, Apple Remote Desktop™, and others.

Proxy server 106 may be further configured to retrieve, from secure storage 110, a second agent 114. First agent 112 may be configured to communicate, via network 102, to initiate execution of second agent 114 on the target network resource 108, as discussed below. In some embodiments, second agent 114 executes using a least-privilege credential or using least-privilege permissions, e.g., retrieved from a privilege database or credential vault, associated with the least-privilege requesting identity, e.g., an identity associated with client device 104. Proxy server 106 may, via first agent 112, instruct second agent 114 to perform an action remotely on target network resource 108 through the remote session using the least-privilege credential or using the least-privilege permissions.

Network 102 may be an on-premises network (e.g., local area network), a cloud network (e.g., private cloud, public cloud, or hybrid cloud network), or a combination of these types of networks. As an example of a cloud-based network deployment, proxy server 106 may run as a Docker™ container instance, or other virtualized instance, on a host machine. Although FIG. 1 depicts client device 104 as separate from the network 102 in which proxy server 106 and target network resource 108 are located, in certain embodiments all of these devices are located in the same network, each is located in a different network, or they are located in overlapping networks.

Secure storage 110 may be, for example, a database or storage server. Secure storage 110 may be any suitable combination of data storage devices, which may optionally include any type or combination of slave databases, load balancers, dummy servers, firewalls, back-up databases, and/or any other desired database components. In some embodiments, secure storage 110 may be employed as a cloud service, such as a Software as a Service (SaaS) system, a Platform as a Service (PaaS), or Infrastructure as a Service (IaaS) system. For example, secure storage 110 may be based on infrastructure of services of Amazon Web Services™ (AWS), Microsoft Azure™, Google Cloud Platform™, Cisco Metapod™, Joyent™, vmWare™, or other cloud computing providers. Secure storage 110 may include other commercial file sharing services, such as Dropbox™, Google Docs™, or iCloud™. In some embodiments, secure storage 110 may be a remote storage location, such as a network drive or server in communication with network 102.

The system configuration illustrated in FIG. 1 is an example configuration depicting general aspects of the disclosed embodiments. A discussion of techniques and processes for least-privilege access to and control of remote resources follows with respect to FIGS. 2A-2D and 3. While certain aspects of the techniques refer to the elements shown in FIG. 1, the disclosed processes are not limited to the particular configuration illustrated in FIG. 1. While various modifications to the general configuration of system 100 are detailed in this disclosure, other modifications are contemplated even if not specifically described. It is noted, for example, that the general principles of the disclosed embodiments are not tied to any specific infrastructure: they may be performed on any computer, server or service, on any infrastructure, on premise, distributed among different infrastructures, and in any cloud. The disclosed systems are operable within any cloud technology and implementation, known and yet to be known in the art.

Figure 2A:
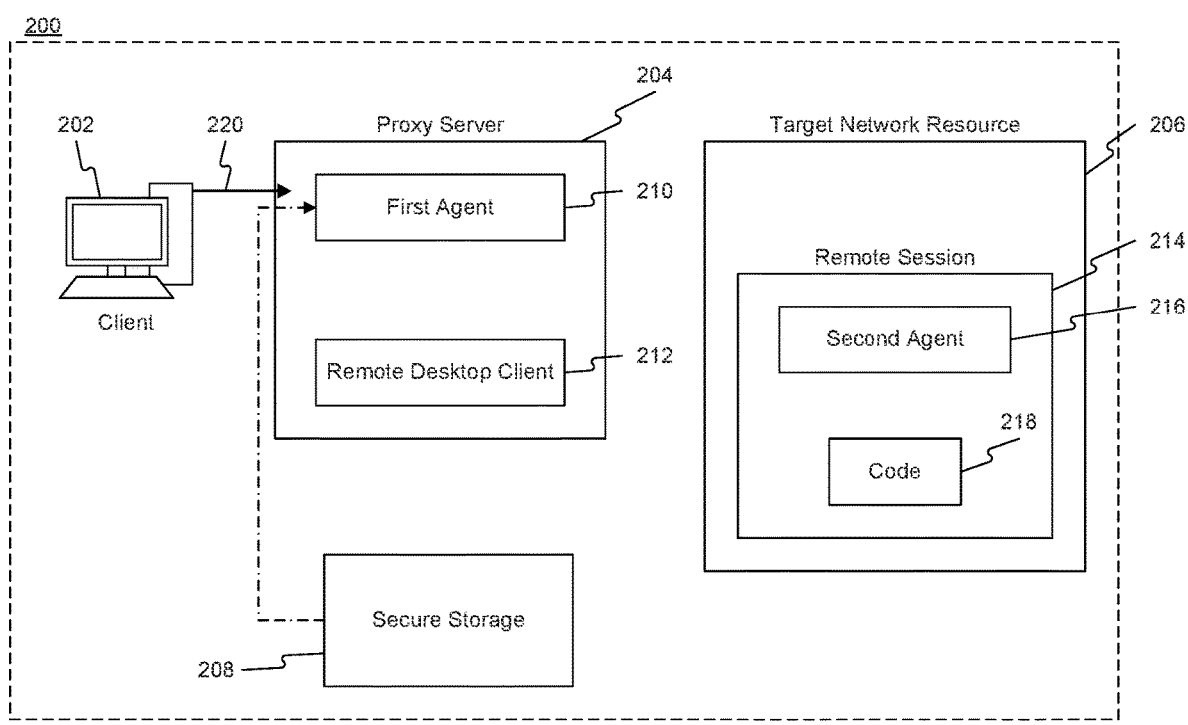
FIGS. 2A-2D illustrate exemplary processes for accessing and controlling a target resource, in accordance with disclosed embodiments.

FIGS. 2A-2D illustrate another example system 200 for using least-privilege techniques to access and control target resources, for example, causing target resources to execute code. In FIGS. 2A-2D, client device 202 may be similar to client device 104 described above in connection with FIG. 1. Further, proxy server 204 may be similar to proxy server 106, target network resource 206 may be similar to target network resource 108, and secure storage 206 may be similar to secure storage 110, discussed above regarding system 100. Proxy server 204 may be configured to execute first agent 210 and remote desktop client 212. Additionally, target network resource 206 may be configured to run a remote session 214 during which second agent 216 may execute code 218 to run one or more processes on target network resource 206. While FIG. 2A depicts the first agent 210 causing code 218 to be run on target network resource 206, in other embodiments first agent 210 may download data to target network resource 206, retrieve data from target network resource 206, updating configuration settings on target network resource 206, or perform other actions on target network resource 206.

FIG. 2A illustrates Step 220 in a process for accessing target network resource 206 by client device 202. In FIG. 2A, client device 202 may transmit a prompt or request to proxy server 204. The prompt may include details associated with the request to access a remote resource, e.g., the request may identify a target resource (e.g., target network resource 206) that an identity associated with client device 202 wishes to access (e.g., via network 102). For example, the prompt may include an IP address, MAC address, cloud computing environment identifier, resource identifier, or other indicia identifying target network resource 206. Further, the prompt may include at least one of: a request from a client network resource 202, or a scheduled event involving access to the target network resource. For example, a scheduled event may be a software update process, a backup or recovery process, a maintenance process, a network configuration update process, etc. The prompt may also include a request to perform an action remotely on the target network resource 206. At Step 220, proxy server 204 may, in response to identifying the prompt, retrieve first agent 210 from secure storage 208. While in some embodiments first agent 210 is retrieved from secure storage 208 (e.g., a storage resource involving authentication, encryption, etc.), in other embodiments the first agent 210 is stored locally at proxy server 204 and access to secure storage 208 is unnecessary.

Figure 2B:
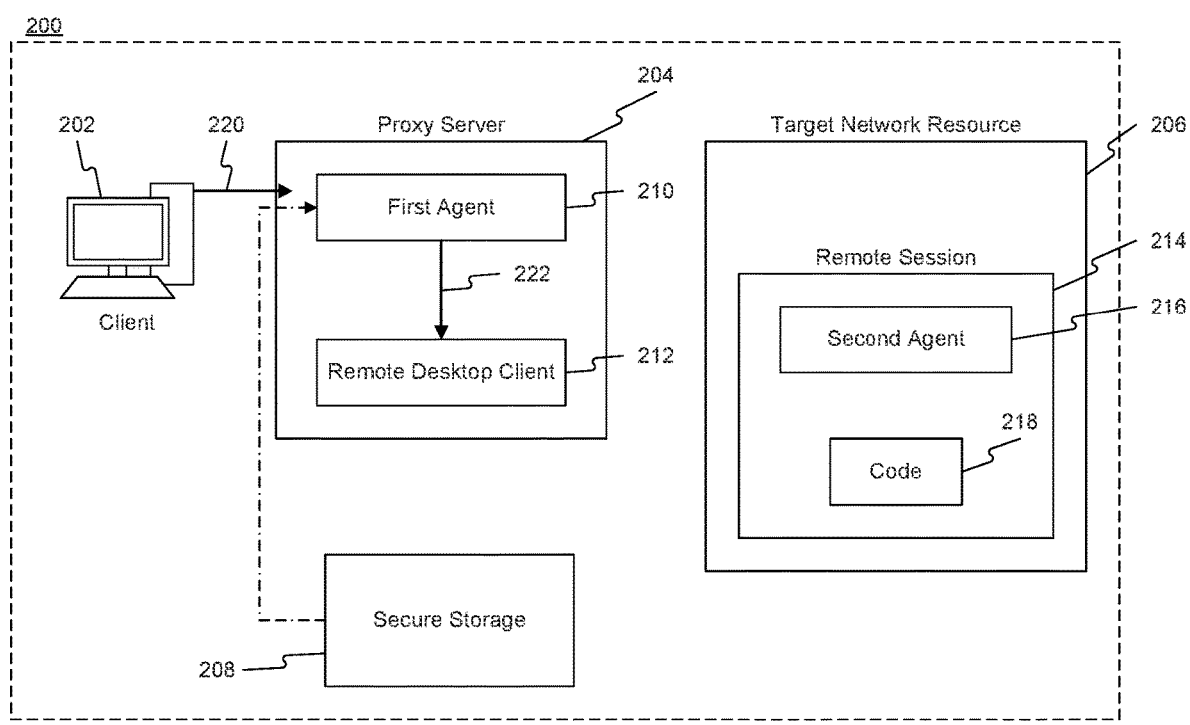

FIG. 2B illustrates Step 222 in a process for accessing target network resource 206 by client device 202. In FIG. 2B, proxy server 204 may execute first agent 210, which is configured to initiate remote desktop client 212 to run on proxy server 204. In some embodiments, first agent 210 may execute on a client computing resource, e.g., client device 202. In another embodiment, first agent 210 may execute on an intermediary computing resource separate from target network resource 206.

Figure 2C:
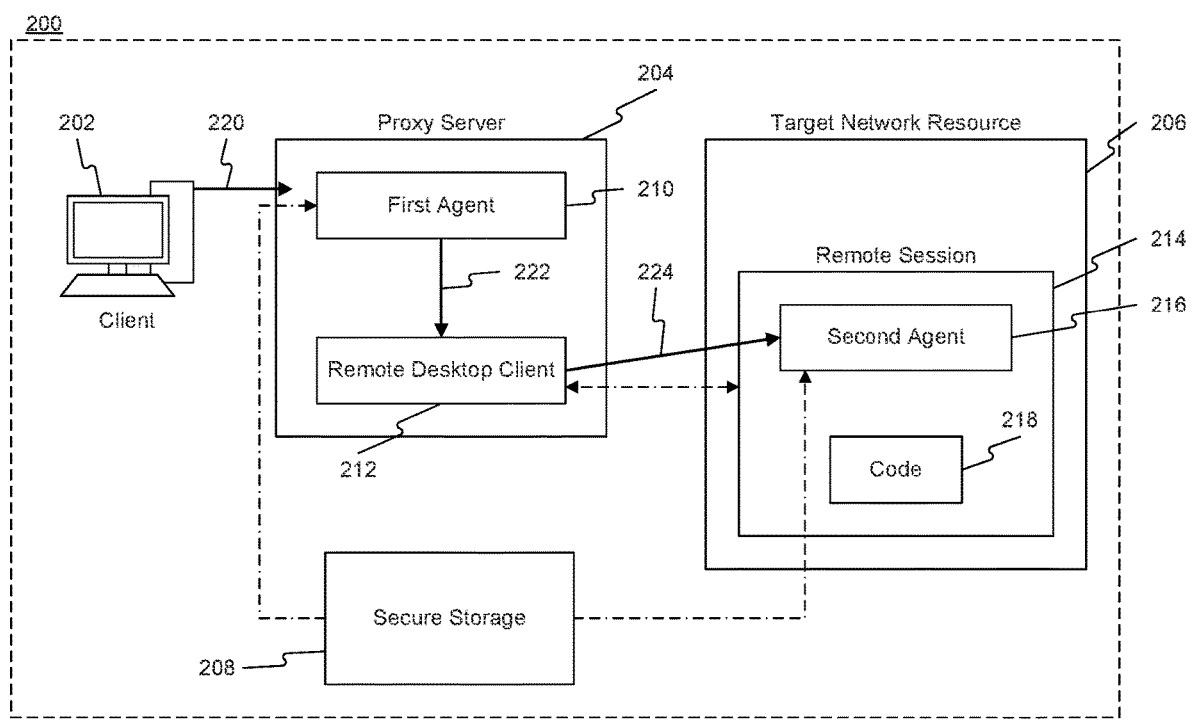

FIG. 2C illustrates Step 224 in a process for accessing target network resource 206 by client device 202. In FIG. 2C, first agent 210 may initiate, by remote desktop client 212, remote session 214 on target network resource 206. First agent 210 may be further configured to control remote desktop client 212 to initiate second agent 216 on target network resource 206. In some embodiments, second agent 216 may be stored in and retrieved from secure storage 208. In some embodiments, second agent 216 may be stored in a separate database from first agent 210. Secure storage 208 may be, for example, a cloud-based storage location accessible via a network, e.g., network 102.

While not shown in FIG. 2C, first agent 210 and/or second agent 216 may also have access to a least-privilege security policy. For example, the least-privilege security policy may be managed by proxy server 204 or a separate security server, and may define levels of least-privilege access for purposes of identities seeking access to target network resource 206. The least-privilege security policy may, in some embodiments, define minimal levels of privileges (e.g., privileged credentials, privileged account types, privileged group memberships, etc.) needed to perform tasks on target network resource 206. Further, in some embodiments, the least-privilege security policy may define minimal temporal durations for which privileged access to target network resource 206 should be granted.

As an example, if the prompt discussed above in connection with Step 220 indicates that an identity is seeking to download data to target network resource 206, the least-privilege security policy may specify "write" privileges for the identity. Further, the least-privilege security policy may specify a duration (e.g., one minute, 15 minutes, etc.) for the operation on target network resource 206. As another example, if the prompt discussed above in connection with Step 220 indicates that the identity is seeking to gather data from target network resource 206, the least-privilege security policy may specify that the identity shall only receive "read" privileges for target network resource 206. Correspondingly, the least-privilege security policy may also specify a minimal time period for such privileged "read" access (e.g., 30 seconds, 30 minutes, etc.). In various embodiments, the least-privilege security policy may be managed by an on-premises platform (e.g., by a CyberArk™, Centrify™, IBM™, etc. platform), a group policy object (GPO), or a cloud-based platform from the same or other providers.

Figure 2D:
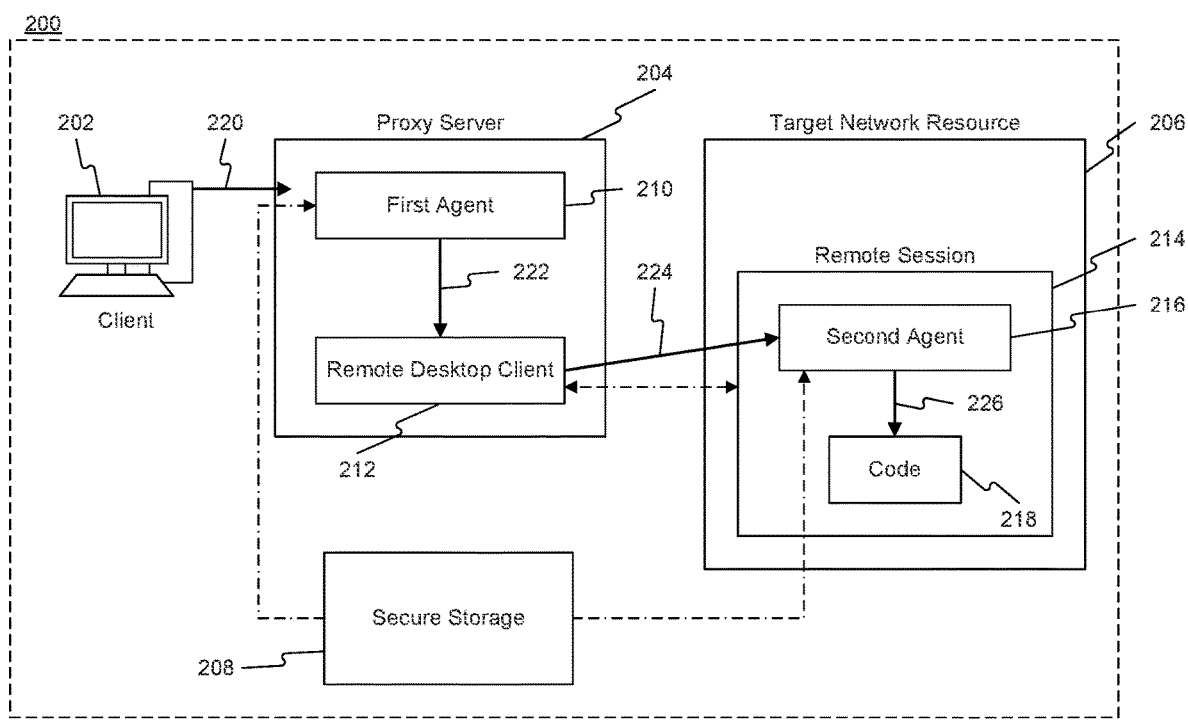

FIG. 2D illustrates Step 226 in a process for accessing target network resource 206 by client device 202. In FIG. 2D, second agent 216 may run, in remote session 214, and execute code 218 on target network resource 206. Of course, other operations beyond running code 218 are possible as well, as discussed above. For example, second agent 216 may run, with least-privileges (e.g., based on the least-privilege security policy as discussed above), to enable a user to retrieve data, execute or schedule automated processes, execute an agent to monitor and record keystrokes, etc., without requiring the user to have full administrator privileges on the target network resource 206. Pursuant to the least-privilege security policy, the operation performed on target network resource 206 may involve a minimal scope, or temporal duration, or both, of privileged access on target network resource 206.

In some embodiments, the process described above with reference to FIGS. 2A-2D may enable an identity to access a group of one or more target network resources. For example, client device 202 may generate a prompt causing proxy server 204 to initiate first agent 210 to cause execution of second agent 216 on a group of target network resources 206. Thus, client device 202 may, via first agent 210, instruct second agent 216 to perform actions (e.g., by executing code 218) remotely on the group of target network resources. In some embodiments, the group of target resources may be based on existing groupings of identities in a network (e.g., all identities with the same privileged group membership, all identities having a particular application installed, all identities having a particular version of an application, all identities having a particular IP address or domain, all identities located in a particular geographic region, all identities in a particular group or division, etc.). In other embodiments, the group of target resources may be designated (e.g., by an administrator) in a customized and/or on-demand manner. These techniques of remotely accessing a group of target network resources 206 may be used, for example, to perform collective operations (e.g., software updates, software patches, configuration updates, data downloads, application installation, data retrieval, data archiving, auditing, etc.).

Figure 3:
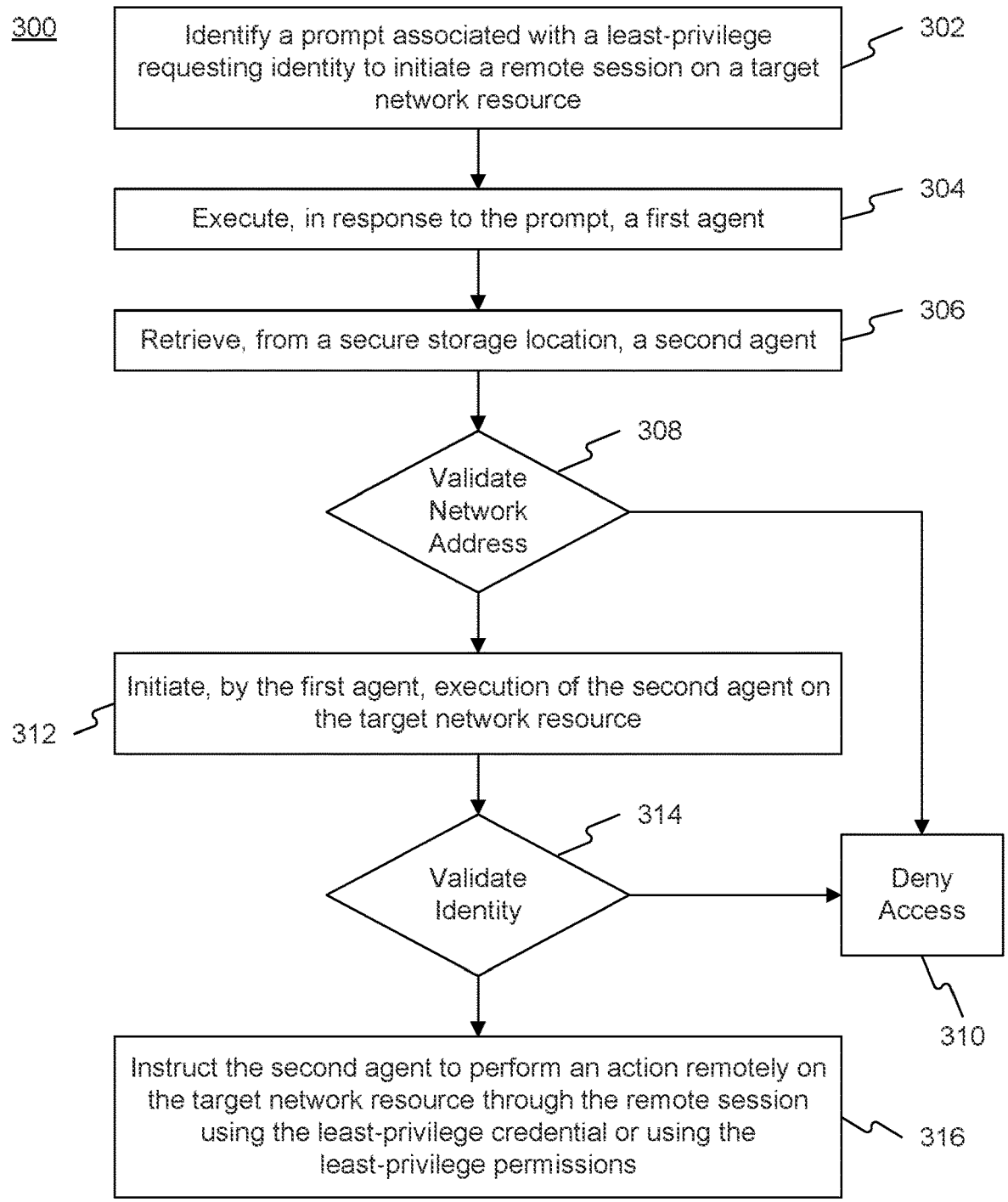
FIG. 3 is a flowchart for an example process for using least-privilege techniques to access and control a target resource, consistent with the disclosed embodiments.

FIG. 3 depicts an example process 300 for using least-privilege access to and control of a target network resource, for example, to cause the target resource to execute code. In accordance with the above embodiments, process 300 may be performed in the environments of systems 100 or 200, as well as variations on such systems or combinations thereof. Further, in some embodiments operations of process 300 may occur transparently to the target network resource. That is, the target network resource may not necessarily experience any visual prompt, challenge, or notification indicating that the second agent is operating.

Process 300 may include an operation 302 of identifying a prompt associated with a least-privilege requesting identity to initiate a remote session on a target network resource. As described above, the request may be generated from a client device associated with the identity. The prompt may be received as part of or from a process or instance associated with the identity executed at the computer device. In accordance with the above embodiments, the client device may be any one of various types of devices with processing and network communications capabilities, such as client device 104 or 202 discussed in FIGS. 1 and 2A-2D, respectively. The prompt may be transmitted via a network, e.g., network 102, to a proxy server, e.g., proxy server 106 or 204. Further, as discussed above, in some embodiments the prompt may indicate what type of activity is being requested to be performed on the target resource. This indication may then be used to access a least-privilege security policy, as discussed above, which may indicate a minimal scope or duration of privileged access.

Process 300 may also include an operation 304 of executing, in response to the prompt, a first agent, e.g., first agent 112 or 210. In some embodiments, operation 304 may further include retrieving the first agent from a secure storage database, e.g., secure storage 110 or 208. In other embodiments, as discussed above, first agent 112, 210 may not be stored in a separate secure database.

Process 300 may also include an operation 306 of retrieving, from a secure storage location, a second agent. As previously described, the second agent may be stored in the same location or database as the first agent. In other embodiments, the secure storage location may be separate from the storage location in which the first agent is stored.

Process 300 may also include an operation 308 of validating a network address of the target network resource identified in the prompt received by the proxy server. For example, prior to initiation of a remote session on the target network resource, e.g., by remote desktop client 212, the proxy server may, via the first agent, validate the network address of the target network resource. If the network address cannot be validated, process 300 may include an operation 310 of denying the request by the identity to access a target network resource. For example, the request may be denied if a resource having the network address cannot be identified or, for example, if the requesting identity is not associated with sufficient privileges to access the resource at the network address.

In another embodiment, conditional on validating the network address information, the system may access a least-privilege credential (e.g., based on a least-privilege security policy, as discussed above) for use in performing the action remotely on the target network resource. The least-privilege credential may be configured based on an identity profile corresponding to the network address information and the prompt information (e.g., the type of action to be performed on the target resource). In some embodiments, the system may query a credential vault or other secure database to retrieve the least-privilege credential. In other embodiments, an intermediary resource may retrieve the least-privilege credential from a credential vault.

If the network address is validated, process 300 may include an operation 312 of initiating, by the first agent, execution of the second agent on the target network resource. For example, as described with reference to FIG. 2C, the first agent, e.g., agent 112 or 210, may cause a remote desktop client to initiate execution of the second agent, e.g., second agent 114 or 216. In some embodiments, after the initiating execution of the second agent, the first agent ceases operation with respect to the second agent. In some embodiments, initiating execution of the second agent may include sending a network location of the second agent to the target network resource.

Process 300 may also include an operation 314 of validating the requesting identity. For example, the proxy server may query a credential vault to validate one or more credentials provided by the requesting identity. In some embodiments, proxy server may validate whether the identity has sufficient privileges with respect to the target network resource, to execute one or more desired processes on the target network resource during the remote session. If the identity cannot be validated, e.g., if the identity does not have sufficient credentials and/or privileges to access the requested target resource, the system, e.g., system 100 or 200, may deny the request by the identity to access the target network resource.

In some embodiments, the attempt to connect to the target network resource may be intercepted by an intermediary network resource or may be routed, by the proxy server, to an intermediary network resource. The intermediary resource may be, for example, an authentication agent or privilege management system. In another example, conditional on validating the identity data, the system may, via the proxy server or intermediary resource, access the least-privilege credential for use in performing the requested action remotely on the target network resource. In some embodiments, the least-privilege credential is associated with an identity different from the least-privilege requesting identity. For example, if the identity is permitted (e.g., based on authentication in operation 314) to perform an action on the target resource requiring administrator (or other elevated) privileges, the least-privilege credential may be associated with an administrator (or other elevated identity).

Process 300 may also include an operation 316 of instructing the second agent to perform an action remotely on the target network resource through the remote session using the least-privilege credential or using the least-privilege permissions. The least-privilege credential may provide a minimal set of privileges necessary to perform the action remotely on the target network resource. In some embodiments, the prompt identified in operation 302 may include identity data associated with the least-privilege requesting identity, e.g., the identity associated with client device 104 or 202. For example, the first agent, via the proxy server, may cause the second agent to enable the requesting identity to perform one or more actions, without providing administrator-level access to the target network resource, thereby protecting the target resource from attack by a malicious user and facilitating automated processes by identities lacking admin privileges. Because the accorded privileges may be based on the least-privilege policy, as discussed above, they may be provisioned at a minimal level, or for a minimal duration, based on the action to be performed on the target resource.

Figure 4:
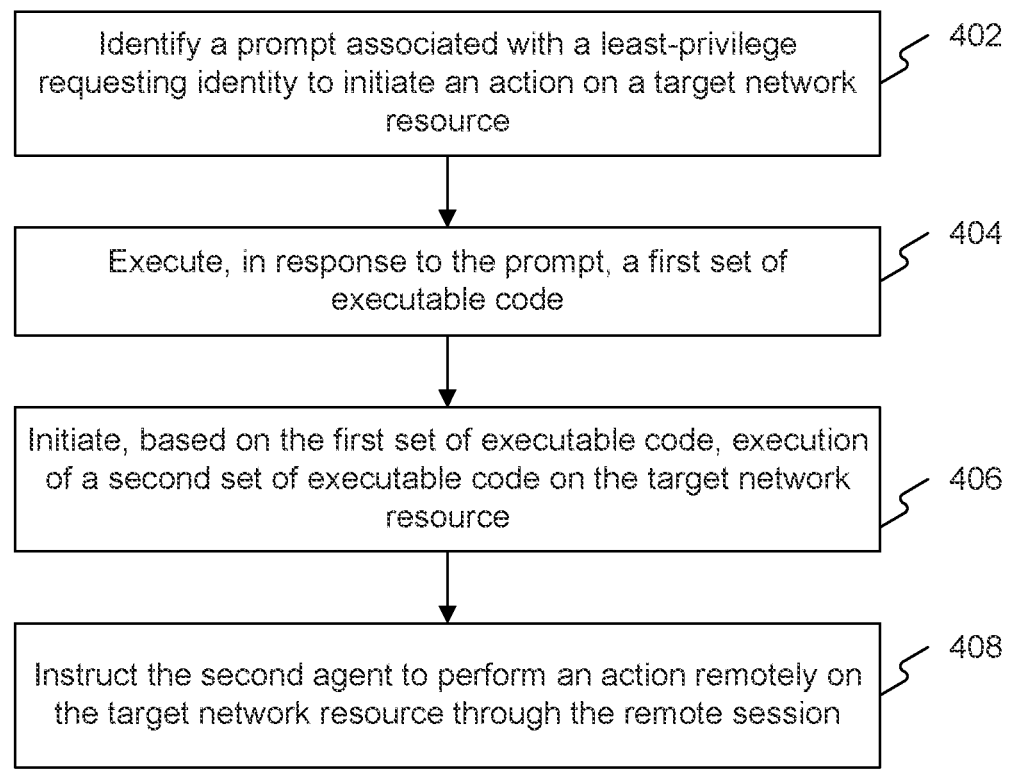
FIG. 4 is a flowchart for another example process for using least-privilege techniques to access and control a target resource, consistent with the disclosed embodiments.

FIG. 4 depicts an example process 400 for using a least-privilege requesting identity to access and control a target network resource, for example, to cause the target resource to execute code. In accordance with the above embodiments, process 400 may be performed in the environments of systems 100 or 200, as well as variations of such systems or combinations thereof. Further, in some embodiments operations of process 400 may occur transparently to the target network resource 108/206. That is, the target network resource 108/206 may not necessarily experience any visual prompt, challenge, or notification indicating that the second agent 114/216 is operating.

In some embodiments, an agent may be executed, upon request, on a target network resource (only in RAM, with no trace left behind). For example, the agent may be first agent 112/210 or second agent 114/216. However, in some embodiments, instead of an agent, a second set of executable code may be executed, as further discussed below.

Additionally, in some embodiments, the system may not require retrieving an agent or a second set of executable code from a storage location (hard drive, memory, storage, or a location that is not the target). In such embodiments, an application does not need to get the agent (or any executable), from the storage location. Instead, the application may use an executable originated from a user, the cloud, a policy, a configuration that comes from the cloud, a configuration file on a local machine, from the application itself, or any other location that the application may pull from. In some embodiments, the system may provide a least-privilege identity with the ability to perform an action on a target without an agent pre-installed, by using predefined sets of executable codes that are not retrieved from a specific location.

Process 400 may include an operation 402 of identifying a prompt associated with a least-privilege requesting identity to initiate an action on a target network resource. As described above, the request may be generated from a client device associated with the identity. The prompt may be received as part of or from a process or instance associated with the identity executed at the computer device. In accordance with the above embodiments, the client device may be any one of various types of devices with processing and network communications capabilities, such as client device 104 or 202 discussed in FIGS. 1 and 2A-2D, respectively. The prompt may be transmitted via a network, e.g., network 102, to a proxy server, e.g., proxy server 106 or 204. Further, as discussed above, in some embodiments the prompt may indicate what type of activity is being requested to be performed on the target resource. This indication may then be used to access a least-privilege security policy, as discussed above, which may indicate a minimal scope or duration of privileged access. In other embodiments, the prompt may not indicate any type of activity that is being requested. In some embodiments, the system does not require the user to give the type of activity being requested or executed.

In some embodiments, an identity (e.g., not a least-privilege identity but instead a powerful identity, such as an administrator) may request to perform an activity. In some embodiments, the requesting identity may be a guest, an unknown user, or someone who has not yet registered for a least-privilege requesting identity.

In one embodiment, a user, e.g., a default user, an anonymous user, or guest, may provide a command to run an action on the target. If the user does not provide user credentials, the system may use the default credentials to run the action on the target which are also the least-privilege credentials. The least-privilege credentials may be developed according to least-privilege policies, as discussed above.

In some embodiments, the prompt may include a request from a client network resource (e.g., a request for access, a request to perform an action, or another type of request). Further, the prompt may include or be based on a scheduled event involving access to the target network resource. For example, this may be a scheduled maintenance event, update or patch event, data pulling or pushing event, or other types of events. In some embodiments, the prompt may further include an indication of a type of requested activity. In some embodiments, the prompt may include network address information, consistent with above embodiments.

In some embodiments, the identity may indicate an activity to be performed on the target machine. In some embodiments, the identity alone, without the prompt, is enough to determine the activity to be performed. For example, a particular entity may be associated with a particular activity (e.g., specific client is associated with an activity of copying data from the target machine to another network location). Machine learning may also be used to link an identity to an activity. For example, the activities of an identity (or many identities) may be observed and logged over time. Based on such recorded activity data, it may be determined that an identity has a high likelihood of performing a specific activity. Further, the likelihood may be specific to a particular time of day, parameter of the client, setting of the client, or the like. In this way, machine learning may be used to learning, and thus associate to an identity, specific actions it is likely to perform or request based on activity history. In some embodiments, it may be helpful to know the type of activity that is being requested because that can help determine the best, least-privileged policy to apply (e.g., based on policies as discussed above). If the system may identify the requested activity, it may help, but it is not required because the system can use the same credentials that the identity provides. The credentials provided by the identity may be used to perform the action (e.g., at the target resource 108/206).

In one embodiment, a user may run something (e.g., a script file, command, or application, etc.), which is an indication of what the user would like to run, and provide an expectation for an action on the target (without any other indication of the activity). The user or system may not have to receive or request the type of activity and, instead, may simply try to perform the action. In response, the system may address this for the user by approaching the policy, as discussed above. The system may then determine that the user may perform the action based on the policy (e.g., least-privilege policy) and retrieve the set of code to perform the action on the target without deploying the agent.

In one embodiment, a user may log in (e.g., at the target resource 108/206) using their credentials. The user may perform any allowed action at the target according to a policy. Correspondingly, actions beyond the scope of permissions associated with the credentials may be disabled, blocked, or unavailable. In such an embodiment, the user may try to execute a command but does not have the needed permission. In response, the application may provide the ability to run code on a remote machine (e.g., at the target resource 108/206) seamlessly for the user (without opening a remote session through the target).

Process 400 may also include an operation 404 of executing, in response to the prompt, a first set of executable code. In some embodiments, in response to an identity (e.g., not a least-privilege identity but instead a powerful identity, such as an administrator) requesting to perform an activity, the system, at operation 404, may execute a first set of executable code retrieved from somewhere (e.g., a user, a cloud, a policy, a configuration that comes from the cloud, a configuration file on a local machine, or from the application itself, or any other location the application may pull from).

In one embodiment, the system may provide a prompt to the user to either choose a script to run, upload a script to run, or provide a pointer or reference to a file that the application needs to run. In response to an indication from the user (asking the administrator to perform an activity), the application may then perform the activity.

Process 400 may also include an operation 406 of initiating, based on the first set of executable code, execution of a second set of executable code on the target network resource, wherein the second set of executable code executes using a least-privilege credential or using least-privilege permissions, the least-privilege credential and the least-privilege permissions being determined according to a least-privilege security policy associated with a type of activity expected to be performed on the target network resource. In some embodiments, the initiating may occur transparently to the target network resource, as discussed above.

In some embodiments, the least-privilege credential or least-privilege permissions are associated with the least-privilege requesting identity. In some embodiments, the least-privilege credential or permissions are customized for the user or identity. For example, the credential or permissions may be determined according to a least-privilege policy, as discussed above. In some embodiments, the credential or permissions may have a usage limitation (e.g., one-time use, one hour of validity, etc.).

In some embodiments, based on the first set of executable code, the system may initiate execution of a second set of executable code. In some embodiments, the second set of executable code is one of a script file, a text script, a command, an executable file, an executable moved to a RAM (of a remote machine, for example), or a pointer. In some embodiments, the second set of executable code is a binary script or DLL. For example, in one embodiment, a script file may be run on the target (e.g., at the target resource 108/206). In some embodiments, the second set of executable code is retrieved from at least one of the requesting identity, a shared resource, a secured resource, or a cloud-based resource.

In some embodiments, the pointer may be a pointer to code, a pointer to anything that can be run, a pointer to a link to a shared location, a pointer to a file, a pointer to an API, etc. Additionally, the pointer may trigger an event. In some embodiments, after the initiating execution, the first set of executable code ceases operation with respect to the second set of executable code.

Process 400 may also include an operation 408 of instructing the second set of executable code to perform the action remotely on the target network resource through a remote session using the least-privilege credential or using the least-privilege permissions. In some embodiments, the instructing may occur transparently to the target network resource, as discussed above. In some embodiments, using permissions corresponding to the user, the system may perform an action on the target network resource (e.g., at the target resource 108/206).

In some embodiments, process 400 may further include an operation of linking a particular action to a particular target or a particular identity. Additionally, the system may use artificial intelligence or machine learning, as discussed above, for linking a particular action to a particular target. This may be based on a user, a role, existing credentials, an application running a backup, or a time of day, as discussed above. In some embodiments, the linking of the particular action to the particular target or particular identity is based on at least one of an attribute related to the identity, an attribute related to the particular target, an attribute related to the particular action, or an environment variable. The environment variable may include, for example, a time of day, an operation system, a version of the target or the client, a user, a role, an existing credential, or configuration parameters, etc. In some embodiments, the linking is performed using machine learning operations. In some embodiments, the system may use machine learning algorithms to determine an expected action on the target. Various tools may be used for the machine learning operations, including Tensor-Flow™, Google AI™, Apple Core ML Tools™, Cortex™, or various others. In order to implement such machine learning techniques, the disclosed embodiments may involve a learning phase, where the actions of particular identities are observed over time. In further embodiments, the machine learning model may be trained using pre-built data sets (e.g., defined data sets representing activity of a particular identity, class of identity, type of identity, etc.).

In some embodiments, conditional on validating network address information, process 400 may include accessing the least-privilege credential for use in performing the action remotely on the target network resource (e.g., at the target resource 108/206). In some embodiments, the least-privilege credential is configured based on an identity profile corresponding to network address information, as discussed above.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant authentication protocols, access tokens, network accounts, privileged accounts, privileged resources, computer devices, communication networks, etc. will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations using least-privilege access to and control of target network resources, the operations comprising:
    identifying a prompt associated with a least-privilege requesting identity to initiate an action on a target network resource;
    executing, in response to the prompt, a first set of executable code;
    initiating, based on the first set of executable code, execution of a second set of executable code on the target network resource, wherein the second set of executable code executes using a least-privilege credential or using least-privilege permissions, the least-privilege credential and the least-privilege permissions being determined according to a least-privilege security policy associated with a type of activity expected to be performed on the target network resource; and
    instructing the second set of executable code to perform the action remotely on the target network resource through a remote session using the least-privilege credential or using the least-privilege permissions.

2. The non-transitory computer readable medium of claim 1, wherein the least-privilege credential or least-privilege permissions are associated with the least-privilege requesting identity.

3. The non-transitory computer readable medium of claim 1, wherein the second set of executable code is originated from at least one of: the requesting identity, a shared resource, a secured resource, a cloud-based resource or an application itself.

4. The non-transitory computer readable medium of claim 1, wherein the second set of executable code is one of a script file, a text script, a command, an executable file, an executable moved to a RAM, or a pointer.

5. The non-transitory computer readable medium of claim 1, wherein the prompt includes at least one of: a request from a client network resource, or a scheduled event involving access to the target network resource.

6. The non-transitory computer readable medium of claim 1, wherein after the initiating execution, the first set of executable code ceases operation with respect to the second set of executable code.

7. The non-transitory computer readable medium of claim 1, wherein the prompt further includes an indication of a type of requested activity.

8. The non-transitory computer readable medium of claim 1, wherein the non-transitory computer readable medium includes instructions for linking a particular action to a particular target or a particular identity.

9. The non-transitory computer readable medium of claim 8, wherein the linking is performed using machine learning operations.

10. The non-transitory computer readable medium of claim 8, wherein the linking of the particular action to the particular target or particular identity is based on at least one of: an attribute related to the identity, an attribute related to the particular target, an attribute related to the particular action or an environment variable.

11. A computer-implemented method using least-privilege access to and control of target network resources, the method comprising:
identifying a prompt associated with a least-privilege requesting identity to initiate an action on a target network resource;
executing, in response to the prompt, a first set of executable code;
initiating, based on the first set of executable code, execution of a second set of executable code on the target network resource, wherein the second set of executable code executes using a least-privilege credential or using least-privilege permissions, the least-privilege credential and the least-privilege permissions being determined according to a least-privilege security policy associated with a type of activity expected to be performed on the target network resource; and
instructing the second set of executable code to perform the action remotely on the target network resource through a remote session using the least-privilege credential or using the least-privilege permissions.

12. The computer-implemented method of claim 11, wherein the least-privilege credential or least-privilege permissions are associated with the least-privilege requesting identity.

13. The computer-implemented method of claim 11, wherein the second set of executable code is originated from at least one of: the requesting identity, a shared resource, a secured resource, a cloud-based resource, or an application itself.

14. The computer-implemented method of claim 11, wherein the second set of executable code is one of a script file, a text script, a command, an executable file, an executable moved to a RAM, or a pointer.

15. The computer-implemented method of claim 11, further comprising, conditional on validating network address information, accessing the least-privilege credential for use in performing the action remotely on the target network resource.

16. The computer-implemented method of claim 11, wherein the least-privilege credential is configured based on an identity profile corresponding to network address information.

17. The non-transitory computer readable medium of claim 11, wherein the prompt further includes an indication of a type of requested activity.

18. The computer-implemented method of claim 11, wherein the computer-implemented method comprises linking a particular action to a particular target or a particular identity.

19. The computer-implemented method of claim 18, wherein the linking is performed using machine learning operations.

20. The computer-implemented method of claim 18, wherein the linking of the particular action to the particular target or particular identity is based on at least one of: an attribute related to the identity, an attribute related to the particular target, an attribute related to the particular action or an environment variable.

* * * * *